Patented Dec. 10, 1935

2,023,755

UNITED STATES PATENT OFFICE 2,023,755

ANTICORROSIVE SOLUTION

Frederick A. Weihe, Jr., Detroit, Mich., assignor to McAleer Manufacturing Company, Detroit, Mich., a corporation of Michigan No Drawing. Application March 10, 1934, Serial No. 715,037

8 Claims. (Cl. 252—5)

This invention relates to the preparation and use of non-corrosive and non-foaming aqueous solutions. More particularly, it pertains to the use and preparation of aqueous solutions of polyhydric alcohols containing means for making such solutions non-corrosive to the metals commonly used in radiators, motors of automobiles and shock absorbers and solutions which do not have any material foaming tendency.

The cooling mediums used in automobiles, etc. where temperatures below freezing are encountered, usually consist of aqueous solutions of mono-hydric or polyhydric alcohols. It is well known that these solutions will corrode metals, iron in particular, causing the formation of rust spots, scaling and a formation of sediment, etc. Various methods have been suggested and patented to eliminate this difficulty, with more or less success. Amongst these, are soaps of fatty acids which as anti-corrosive agents are very efficient. However, soaps have the characteristic of lowering the surface tension of the alcoholic solution to such an extent that the resulting solution foams and froths. As a cooling medium, having such a characteristic, the advantages are out-weighed by the disadvantages as the formation of foam in an automobile cooling medium usually results in loss of the liquid thru the over-flow pipe.

It is the object of this invention to supply a cooling medium which will not be corrosive to metals and to iron in particular. A further object is to supply an inhibitor which added to aqueous alcohol solutions will render said solutions non-corrosive. A still further object is to supply a cooling medium which not only is non-corrosive, but will not exhibit any tendency toward foaming. Other objects will appear hereinafter.

These objectives are accomplished by the following invention which comprises an aqueous alcoholic solution in which is incorporated a saponifiable or partially saponifiable oil and a saponifying agent. The amount of each ingredient is so proportioned that sufficient anti-corrosive action is obtained and yet the solution is maintained in a non-foaming condition. I have discovered that by partially saponifying a saponifiable or partially saponifiable oil with an appropriate saponifying agent, the resulting product incorporated into an aqueous alcoholic solution or water, will result in a non-corrosive and non-foaming solution.

I have discovered that an aqueous alcoholic solution consisting of 40%, more or less, of ethyl alcohol, propyl alcohol and more particularly the poly-hydric alcohols such as ethylene glycol, glycerine and etc. is made non-corrosive by the addition of a saponifiable or partially saponifiable oil such as castor oil, blown castor oil, soya bean oil, blown soya bean oil, linseed oil, etc. which have been partially saponified with an alkylamine, an alklolamine, sodium or potassium hydrate or any other saponifying agent which will result in a soluble or semi-soluble soap. Not only will the resultant solution be non-corrosive, but it will not have any undue tendency to foam, which said solution would have if the oil were completely saponified. I have also discovered that of the saponifiable or partially saponifiable oils, a brown semi-drying oil is to be preferred. This inhibitor or non-corrosive agent may be used in concentrations of from 0.1% on up, with satisfactory results.

For purposes of illustration, the following examples are given:

*Example 1.*—A 40% aqueous solution of either ethyl alcohol, propyl alcohol, ethylene glycol or glycerine may be made non-corrosive and non-foaming by the addition of 0.2% blown castor oil and 0.075% of commercial triethanolamine.

*Example 2.*—A 40% aqueous solution of either ethyl alcohol, propyl alcohol, ethylene glycol or glycerine may be made non-corrosive and non-foaming by the addition of 2.00% blown soya bean oil and .75% of commercial triethanolamine.

*Example 3.*—A 40% aqueous solution of either ethyl alcohol, propyl alcohol, ethylene glycol or glycerine, may be made non-corrosive and non-foaming by the addition of 0.2% blown castor oil and 0.05% of di-amylamine.

The percentages of oil and of the alkyl or alkylolamine given in above examples should not in any way be considered as limiting. I have found that the above ingredients may be varied to a considerable extent in both amounts and ingredients used. In place of blown castor oil or soya bean oil, untreated castor oil, soya bean oil, linseed oil, Chinawood, etc. may be used. Also, other alkyl and alkylolamines may be substituted for those shown. Alkalies such as sodium or potassium hydrate, carbonate, borate, etc. may be substituted successfully. However, it should be borne in mind that the saponifying agent should be used in quantities sufficient only to partially saponify the oil used.

Also, the inhibitors as shown need not be reacted in the presence of aqueous alcoholic solutions, but may be made separate and incorporated into any corrosive water or alcoholic solution at any desired time.

Any of the above examples or modifications of same, may be used successfully in automobiles, tractors, etc. as an anti-freezing cooling medium without causing any undue corrosive or foaming action. The inhibitor, which is the reaction product of a saponifiable or partially saponifiable oil and a saponifying agent plus an excess of oil, may be used for making ordinary water non-corrosive without excessive foaming.

I have found that a cooling medium as outlined above not only is not corrosive, but does not cause any undue foaming. Heretofore, it has been possible to produce non-corrosive alcoholic solutions apparently suitable for use as a cooling medium, but which have failed to be satisfactory either due to the fact that said solutions were too alkaline or had the property of frothing, thereby resulting in loss of the medium thru the over-flow pipe when used in automobiles. The present invention is not only non-corrosive, but is non-foaming. Further, by maintaining a surplus of oil over alkaline material, any free alkaline ingredient that may be added or formed, will be immediately reacted upon by the free saponifiable oil.

As many apparent and widely different embodiments of this invention may be made without departing from the spirit and scope thereof, it is to be understood that I do not limit myself to a specific embodiment thereof except as defined in the appended claims.

I claim:

1. A non-corrosive, aqueous solution of an alcohol containing the reaction product of triethanolamine and blown castor oil.

2. A non-corrosive and non-foaming aqueous solution of an alcohol containing the reaction product of triethanolamine and blown castor oil plus a surplus of blown castor oil.

3. A non-corrosive and non-foaming aqueous solution of ethylene glycol containing the reaction product of commercial triethanolamine and blown castor oil plus a surplus of blown castor oil.

4. Means for rendering a corrosive solution of water soluble alcohols non-corrosive, comprising a reaction product of a saponifiable or partially saponifiable blown semi-drying vegetable oil and a saponifying agent.

5. Means for rendering a corrosive aqueous alcoholic solution non-corrosive comprising a reaction product of a saponifiable or partially saponifiable oil and a saponifying agent and in which the saponifiable oil is a blown vegetable oil.

6. Means for rendering a corrosive aqueous alcoholic solution non-corrosive comprising a reaction product of a saponifiable or partially saponifiable oil and a saponifying agent and in which the saponifiable oil is blown castor oil.

7. Means for rendering a corrosive aqueous alcoholic solution non-corrosive comprising a reaction product of a saponifiable or partially saponifiable oil and a saponifying agent and in which the saponifiable oil is blown soya bean oil.

8. Means for rendering a corrosive aqueous alcoholic solution non-corrosive comprising a reaction product of a saponifiable or partially saponifiable blown oil and a saponifying agent and in which the saponifying agent is an alkylamine or an alkylolamine.

FREDERICK A. WEIHE, Jr.